(12) United States Patent
Asari et al.

(10) Patent No.: US 9,362,563 B2
(45) Date of Patent: Jun. 7, 2016

(54) ENERGY STORAGE DEVICE, METHOD FOR MANUFACTURING THE SAME, AND APPARATUS INCLUDING THE SAME

(75) Inventors: Takuma Asari, Hyogo (JP); Hironori Kumagai, Osaka (JP); Shigeo Hayashi, Kyoto (JP); Yasuhiro Hashimoto, Nara (JP); Takahiro Kawashima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1060 days.

(21) Appl. No.: 12/602,934

(22) PCT Filed: Mar. 12, 2009

(86) PCT No.: PCT/JP2009/001116
§ 371 (c)(1),
(2), (4) Date: Dec. 3, 2009

(87) PCT Pub. No.: WO2009/125540
PCT Pub. Date: Oct. 15, 2009

(65) Prior Publication Data
US 2010/0178564 A1 Jul. 15, 2010

(30) Foreign Application Priority Data
Apr. 11, 2008 (JP) .................................. 2008-103690

(51) Int. Cl.
*H01M 8/00* (2006.01)
*H01M 4/587* (2010.01)
(Continued)

(52) U.S. Cl.
CPC ............... *H01M 4/587* (2013.01); *H01G 9/016* (2013.01); *H01G 9/058* (2013.01); *H01G 11/12* (2013.01);
(Continued)

(58) Field of Classification Search
CPC ....................................................... H01M 4/02
See application file for complete search history.

(56) References Cited

U.S. PATENT DOCUMENTS

2001/0003863 A1* 6/2001 Thibault et al. ............... 29/623.1
2001/0033974 A1* 10/2001 Gavelin et al. ................ 429/306
(Continued)

FOREIGN PATENT DOCUMENTS

JP 2004062183 A * 2/2004
JP 2005-190721 7/2005
(Continued)

OTHER PUBLICATIONS

Yoshikawa et al., JP2007-266548A (Machine English translation), Electric Double Layer Capacitor using Carbon Nanotube, Oct. 11, 2007.*

*Primary Examiner* — Patrick Ryan
*Assistant Examiner* — Jose Colucci Rios
(74) *Attorney, Agent, or Firm* — McDermott Will & Emery LLP (57) ABSTRACT

The present invention provides a highly reliable energy storage device capable of preventing a reaction current from flowing in a carbon nanotube electrode by ionizing a catalyst metal or a substrate metal to cause the metal to flow out to an electrolytic solution. An energy storage device of the present invention includes: at least a pair of electrode bodies that are a cathode and an anode; and an electrolytic solution. At least one of the electrode bodies is configured such that a layer of carbon nanotubes is formed on an electric conductor. A coupling region where one ends of the carbon nanotubes are coupled to and electrically connected to the electric conductor and a non-coupling region where ends of the carbon nanotubes are not coupled to the electric conductor are formed on a surface of the electric conductor. The carbon nanotubes having one ends connected to the coupling region are toppled to cover a surface of the non-coupling region.

19 Claims, 6 Drawing Sheets (51) Int. Cl.
*H01G 9/008* (2006.01)
*H01G 9/04* (2006.01)
*H01G 11/12* (2013.01)
*H01G 11/26* (2013.01)
*H01G 11/28* (2013.01)
*H01G 11/36* (2013.01)
*H01G 11/86* (2013.01)
*H01M 4/62* (2006.01)
*H01M 4/66* (2006.01)
*H01M 10/052* (2010.01)

(52) U.S. Cl.
CPC ............... *H01G 11/26* (2013.01); *H01G 11/28* (2013.01); *H01G 11/36* (2013.01); *H01G 11/86* (2013.01); *H01M 4/625* (2013.01); *H01M 4/663* (2013.01); *H01M 10/052* (2013.01); *Y02E 60/13* (2013.01); *Y02T 10/7011* (2013.01); *Y02T 10/7022* (2013.01)

(56) References Cited

U.S. PATENT DOCUMENTS

| | | | | |
|---|---|---|---|---|
| 2002/0085968 | A1* | 7/2002 | Smalley | B01J 19/081 428/367 |
| 2002/0102450 | A1* | 8/2002 | Badding et al. | 429/32 |
| 2003/0170166 | A1* | 9/2003 | Smalley et al. | 423/447.1 |
| 2006/0154145 | A1* | 7/2006 | Lee | H01M 2/06 429/211 |
| 2006/0269802 | A1* | 11/2006 | Yamaki et al. | 429/9 |
| 2008/0039557 | A1 | 2/2008 | Li et al. | |
| 2008/0160409 | A1* | 7/2008 | Ishida | B01J 21/08 429/220 |
| 2008/0248385 | A1* | 10/2008 | Matsumura | H01M 4/13 429/209 |
| 2010/0075201 | A1* | 3/2010 | Nakanishi | H01M 4/8657 429/434 |
| 2010/0086837 | A1* | 4/2010 | Asari et al. | 429/94 |
| 2010/0294424 | A1* | 11/2010 | Hart et al. | 156/249 |

FOREIGN PATENT DOCUMENTS

| | | | |
|---|---|---|---|
| JP | 2005-259760 | | 9/2005 |
| JP | 2006-228818 | | 8/2006 |
| JP | 2006228818 | A * | 8/2006 |
| JP | 2007-257886 | | 10/2007 |
| JP | 2007-266548 | | 10/2007 |
| JP | 2007266548 | A * | 10/2007 |
| JP | 2008-044099 | | 2/2008 |
| JP | 2008-230957 | | 10/2008 |
| WO | WO 2005076392 | A1 * | 8/2005 |
| WO | WO 2006022254 | A1 * | 3/2006 |
| WO | WO 2007078004 | A1 * | 7/2007 |
| WO | WO 2007107832 | A1 * | 9/2007 |
| WO | WO 2008090876 | A1 * | 7/2008 |

* cited by examiner

(a) Top View (b) Cross-sectional View

ENERGY STORAGE DEVICE, METHOD FOR MANUFACTURING THE SAME, AND APPARATUS INCLUDING THE SAME

RELATED APPLICATIONS

This application is the U.S. National Phase under 35 U.S.C. §371 of International Application No. PCT/JP2009/001116, filed on Mar. 12, 2009, which in turn claims the benefit of Japanese Application No. 2008-103690, filed on Apr. 11, 2008, the disclosures of which Applications are incorporated by reference herein.

TECHNICAL FIELD

The present invention relates to an energy storage device, a method for manufacturing the energy storage device, and an apparatus including the energy storage device.

BACKGROUND ART

Two main types of an energy device are an energy storage device and an energy generating device. Typical examples of the energy storage device are an electrochemical capacitor and a battery, which have already been used in their appropriate markets. Examples of the electrochemical capacitor are: an electric double layer capacitor which uses an activated carbon as a polarizable electrode and utilizes only an electric double layer formed at an interface between a pore surface of the activated carbon and an electrolytic solution; and a redox capacitor which uses a transition metal oxide, such as ruthenium nitrate, whose valence continuously changes, and an electrically-conductive polymer which can be doped. Moreover, two main types of the battery are: a secondary battery which can be charged and discharge by utilizing intercalation and chemical reactions of active materials; and a primary battery which is basically not rechargeable after being discharged once.

The most basic component common to all of these various energy storage devices is an electrode active material which can discharge energy in principle. In addition, to take out the energy stored in the electrode active material, a current collector (electric conductor) is further required, which has electron conductivity and is electrically connected to the electrode active material. Since the current collector needs to transfer the energy of the electrode active material with high efficiency, a metallic material, such as aluminum, copper, or stainless steel, which is very low in resistance is typically used as the current collector. However, in the case of using the electrolytic solution, such as a sulfuric acid aqueous solution, which causes metal to corrode, for example, a rubber-based material to which electrical conductivity is given may be used as the current collector.

As the application of the energy storage device is increasing in recent years, there is a need for the energy storage device which has excellent properties, i.e., which is lower in resistance and can discharge higher current. First, these properties were expected of the electric double layer capacitor which was the lowest in resistance in principle among the energy storage devices, and the electric double layer capacitor having such properties was realized by disposing a carbon-based electrically-conductive layer on a joint surface between the electrode active material and the current collector. Since an electronic resistance in the electrode active material of the electric double layer capacitor is comparatively lower than those of the other secondary batteries, a contact resistance between the electrode active material and the current collector accounts for a nonnegligible percentage with respect to the resistance of a device, so that the carbon-based electrically-conductive layer is disposed on the joint surface. At present, similar technical trend to the above has been pursued for a lithium secondary battery.

To solve the above problems, an energy storage device has been studied which uses as the electrode active material a carbon nanotube whose one end is connected to the current collector (see Patent Document 1 for example). The carbon nanotube is a hollow carbon material having a minimum diameter of 0.4 nm and a maximum length of 4 mm. Unlike conventional pellet electrodes, a carbon nanotube electrode in which one end of the carbon nanotube is connected to a substrate does not require an electric conduction assisting material and a binding material. Therefore, a volume fraction of the active material is 100%. In addition, since the carbon nanotube is connected to the current collector that is the substrate, the carbon nanotube electrode is very low in electrical resistance. Further, the carbon nanotube has an extremely high ideal specific surface area of 2,625 $m^2/g$, and is especially suitable to be applied to the electric double layer capacitor.

However, in the carbon nanotube electrode, the catalyst metal used when synthesizing the carbon nanotube remains on the electric conductor. Therefore, if a voltage is applied to the electrode as the energy storage device, the catalyst metal and a metal constituting the electric conductor are ionized, and flow out to the electrolytic solution. Then, a reaction current flows, and this decreases reliability of the energy storage device. Therefore, it has been extremely difficult to apply the carbon nanotube electrode to the energy storage device having the above structure.

Patent Document 1 describes that in the electric double layer capacitor including the polarizable electrode formed by the carbon nanotube formed in an electrode forming region of the substrate, the carbon nanotube is formed in the electrode forming region except for a predetermined region. This aims to obtain large electric capacity from initial charging and discharging and obtain large electric capacity even at low temperature, by facilitating impregnation of an inside of the carbon nanotube with the electrolytic solution. Patent Document 1 does not describe a structure in which the formed carbon nanotube is toppled to cover the surface of a non-forming region or the decrease in reliability of the energy storage device due to the reaction current generated by the ionization of the metal.

Patent Document 2 describes that in manufacturing not the energy storage device but an electronic device, such as a transistor, a plurality of electrodes are formed on an insulating film disposed on the surface of the substrate, the carbon nanotube is formed on one electrode so as to be vertically aligned, and then the carbon nanotube is toppled toward the other electrode with a base of the carbon nanotube fixed. This aims to surely connect these two electrodes on the substrate by using the carbon nanotube as a wire material extending between the electrodes. Patent Document 2 does not describe the use of the carbon nanotube as the electrode active material. Moreover, Patent Document 2 does not describe the energy storage device. Therefore, Patent Document 2 does not describe the decrease in reliability of the energy storage device due to the reaction current generated in the electrolytic solution by the ionization of the metal.

Patent Document 1: Japanese Laid-Open Patent Application Publication 2005-259760
Patent Document 2: Japanese Laid-Open Patent Application Publication 2006-228818

DISCLOSURE OF THE INVENTION

Problems to be Solved by the Invention

A technical object achieved by the present invention is to solve the above problems. To be specific, an object of the present invention is to provide: an energy storage device including an electrode body having a carbon nanotube as an electrode active material and capable of improving its reliability by preventing the occurrence of a phenomenon in which when a voltage is applied to a carbon nanotube electrode, a catalyst metal and a metal constituting an electric conductor that is a substrate are ionized and flow out to an electrolytic solution, and therefore a reaction current flows; a method for manufacturing the energy storage device; and an apparatus including the energy storage device.

Means for Solving the Problems

The present inventors have diligently studied and presumed that in the carbon nanotube electrode, since the catalyst metal and the metal of the substrate are exposed to the electrolytic solution, the catalyst metal and the metal of the substrate flow out to the electrolytic solution and therefore the reaction current flows. As a result, the present inventors have found that the above problem can be solved by a configuration in which a coupling region on which the carbon nanotubes are formed and a non-coupling region on which the carbon nanotubes are not formed are formed on the surface of the substrate, a layer of the carbon nanotubes on the coupling region is compressed and the carbon nanotubes are toppled, and the compressed layer of the carbon nanotubes covers the surface of the substrate including the non-coupling region. Thus, the present inventors have achieved the present invention.

To be specific, a first invention of the present invention relates to an energy storage device including: at least a pair of electrode bodies that are a cathode and an anode; and an electrolytic solution, wherein: at least one of the electrode bodies is configured such that a layer of carbon nanotubes is formed on an electric conductor; a coupling region where one ends of the carbon nanotubes are coupled to and electrically connected to the electric conductor and a non-coupling region where ends of the carbon nanotubes are not coupled to the electric conductor are formed on a surface of the electric conductor; and the carbon nanotubes having one ends connected to the coupling region are toppled to cover a surface of the non-coupling region.

Preferably, a volume density of the layer of the carbon nanotubes is 0.1 to 1.5 g/cc.

Preferably, the pair of electrode bodies are rolled, and the non-coupling region is formed in a stripe pattern extending in a direction parallel to a lead wire connected to the electrode body.

Preferably, the pair of electrode bodies are not rolled, and the non-coupling region is formed in a stripe pattern extending in a direction parallel to a lead wire connected to the electrode body.

Preferably, a formula "A/B=1" is satisfied where A is a length of the carbon nanotube, and B is a width of the non-coupling region.

Preferably, a water-repellent film is disposed in the non-coupling region on the surface of the electric conductor.

Preferably, the water-repellent film is made of a fluorinated material.

Preferably, the energy storage device is an electric double layer capacitor.

A second invention of the present invention relates to a method for manufacturing an energy storage device including: at least a pair of electrode bodies that are a cathode and an anode; and an electrolytic solution, the method including: a first step of forming on a surface of an electric conductor a coupling region where one ends of carbon nanotubes are coupled to and electrically connected to the electric conductor and a non-coupling region where ends of the carbon nanotubes are not coupled to the electric conductor; a second step of forming at least one of the electrode bodies such that the carbon nanotubes having one ends connected to the coupling region are toppled to cover a surface of the non-coupling region; and a third step of impregnating the formed electrode body with the electrolytic solution.

Preferably, in the first step, a catalyst metal layer is formed only in the coupling region, and the carbon nanotubes are then synthesized on the catalyst metal layer by chemical vapor deposition.

Preferably, in order to form the catalyst metal layer only in the coupling region, the electric conductor is covered with a patterning mask to carry out the step of forming the catalyst metal layer.

Preferably, in order to form the catalyst metal layer only in the coupling region, the electric conductor is covered with a patterning mask to form a water-repellent film only in the non-coupling region, and the step of forming the catalyst metal layer is then carried out by dip coating or spin coating.

A third invention of the present invention relates to an electronic device including the energy storage device or a transporting device including the energy storage device.

Effects of the Invention

By adopting the above-described configuration, the energy storage device of the present invention can prevent the reaction current from flowing by ionizing the catalyst metal or the substrate metal to cause the metal to flow out to the electrolytic solution.

With this, in the energy storage device including the carbon nanotube electrode, the reaction of flowing out the metal to the electrolytic solution can be prevented, so that long-term reliability can be improved. Further, since the reaction current decreases, the energy storage device can charge and discharge large current.

The energy storage device of the present invention can achieve the above effects. Therefore, conditions for mounting the energy storage device including the carbon nanotube electrode on a portable device including a wireless communication unit, an electronic device (such as an information processing terminal), a transporting device, and the like are satisfied. Especially, since the energy storage device of the present invention can discharge large current, it can improve the operating time of a portable device having wireless communication function, such as a mobile phone which instantaneously, significantly consumes energy and the operating time of an information processing terminal, such as a notebook computer. In addition, the energy storage device of the present invention can improve an accelerating performance of a transporting device, such as a hybrid car.

BRIEF DESCRIPTION OF THE DRAWINGS

FIG. 5(a) is a top view, and FIG. 5(b) is a cross-sectional view.

FIG. 6(a) shows a lattice pattern, and FIG. 5(b) shows a circular lattice pattern.

FIG. 9(a) is a perspective view, and FIG. 9(b) is a cross-sectional view.

EXPLANATION OF REFERENCE NUMBERS 10 carbon nanotube electrode configured to include non-coupling region and to be compressed
20 carbon nanotube electrode configured to include non-coupling region and not to be compressed
30 carbon nanotube electrode configured not to include non-coupling region and not to be compressed
11, 21, 31 carbon nanotube synthesis catalyst metallic particle
12, 22, 32, 42 carbon nanotube
13, 23, 33, 43, 53, 64 electric conductor
44 carbon nanotube formed in a case where non-coupling region is formed and not compressed
45 carbon nanotube formed in a case where non-coupling region is not formed and not compressed
50 carbon nanotube electrode configured to include non-coupling region and not to be rolled
51 non-coupling region
52, 63 layer of carbon nanotubes
54 lead wire
60 carbon nanotube electrode configured to include non-coupling region formed in a predetermined pattern and not to be rolled
80, 90 energy storage device
81, 91 energy storage device element
82, 92 cathode lead wire
83, 93 cathode
84, 94 anode lead wire
85, 95 anode
86, 96 separator
87 sealing cap
88 metal case
97 laminate case

BEST MODE FOR CARRYING OUT THE INVENTION

The present invention is applicable to all types of energy storage devices, such as an electric double layer capacitor, an electrochemical capacitor, a lithium ion capacitor, a lithium ion secondary battery, an organic battery, and a pseudocapacitor using an oxidized metal or an electrically-conductive polymer. The energy storage device of the present invention is not especially limited as long as an electrode body of the energy storage device is formed such that a layer of carbon nanotubes is formed on an electric conductor. In the following, the electrode body may be referred to as a carbon nanotube electrode.

In the electric double layer capacitor and the electrochemical capacitor, the carbon nanotube can be used for both positive and negative electrodes.

In the lithium ion secondary battery, typically, a silicon compound, a lithium metal, or a lithium oxidized metal, such as a lithium cobalt oxide, is used as the positive electrode, and graphite or the like is used as the negative electrode. In this case, instead of the graphite used as the negative electrode, the carbon nanotube having the same graphene structure as the graphite can be used. Further, in the positive electrode, the carbon nanotube can be used as a supporting material of an active material.

In the lithium ion capacitor, an activated carbon is suggested as the positive electrode, and the graphite is suggested as the negative electrode. Therefore, the carbon nanotube can be used for both positive and negative electrodes.

In the organic battery, an organic material is suggested to be used as the active material of at least one of the electrodes, and the carbon nanotube can be used as the supporting material of the organic material.

As described above, in the present invention, the carbon nanotube itself may serve as an electrode active material, or may serve as the supporting material of the other electrode active material.

An average diameter of the carbon nanotube is in a range from about 0.1 to 100 nm. However, considering that a lithium ion having an ion radius of 0.074 nm or an electrolyte ion having an ion radius of about 0.5 nm enters the carbon nanotube, the average diameter of the carbon nanotube is desirably in a range from 0.1 to 10 nm, and more desirably in a range from 0.1 to 5 nm.

It is preferable that a distance between the carbon nanotubes be short for attaining high density. However, the distance between the carbon nanotubes is adjusted such that the electrolyte ion in an electrolytic solution can adequately move.

In the present invention, the carbon nanotube electrode is formed such that a layer of the carbon nanotubes is formed on a surface of the electric conductor. The layer of the carbon nanotubes is formed such that the layer of the carbon nanotubes aligned vertically is formed on the surface of the electric conductor and is then compressed.

A coupling region and a non-coupling region are formed on the surface of the electric conductor. In the coupling region, one end of each carbon nanotube is coupled to and electrically connected to the electric conductor directly or via a catalyst metal. Meanwhile, in the non-coupling region, ends of the carbon nanotube are not coupled to the electric conductor, but the carbon nanotube having one end connected to the coupling region is toppled, and the side surface of the toppled carbon nanotube covers the non-coupling region on the surface of the electric conductor.

Preferably, a catalyst metal is interposed between the electric conductor and one end of the carbon nanotube connected to the electric conductor. In this case, since the electric conductor and the carbon nanotube are electrically connected to each other, the carbon nanotube serves as the electrode active material. Here, the other end (end opposite to one end coupled to the electric conductor) of the carbon nanotube is not coupled to the electric conductor, so that electrical connection between the other end of the carbon nanotube and the electric conductor are not practically secured.

Examples of a method for synthesizing the carbon nanotube on the surface of the electric conductor are chemical vapor deposition, laser ablation, arc discharge, and electrolytic synthesis in solution. It is preferable that a catalyst metal layer be formed on the surface of the electric conductor, and the carbon nanotube be then synthesized on the catalyst metal layer by the chemical vapor deposition. The catalyst metal may move to a tip end of the carbon nanotube depending on synthesis conditions. Even in this case, the electrical connection between one end of the carbon nanotube and the electric conductor is maintained.

Metallic foil can be used as the electric conductor which also serves as the supporting member of the carbon nanotube. Typically, aluminum foil is used as the electric conductor. However, copper foil, stainless steel foil, iron, nickel, chromium, or tungsten may be used as the electric conductor depending on the maximum potential applied thereto. If necessary, a clad material formed by bonding different metals together can be used. In this case, only the metal on the carbon nanotube side, i.e., on the inner surface side serves as a current collector. Moreover, electrically-conductive rubber, such as butylene rubber, can be used as the electric conductor.

Examples of the catalyst metal are nickel, iron, cobalt, copper, yttrium, rhodium, palladium, chromium, zinc, silicon, sulfur, gold, and boron. The catalyst metal is determined depending on the carbon nanotube and its synthetic method. Catalyst metallic particles increase in size by heating or preheating at the time of synthesizing the carbon nanotube. It is commonly said that a diameter of the catalyst metallic particle increased in size and a diameter of the carbon nanotube synthesized are correlated to each other. In a case where the desired diameter of the carbon nanotube is 1 to 100 nm, it is desirable that the diameter of the catalyst metallic particle at the maximum applied temperature be 1 to 100 nm. For example, in a case where the catalyst metal is formed by vacuum deposition, it is desirable that the thickness of the catalyst metal layer be 0.1 to 10 nm.

Hereinafter, the present invention will be explained in reference to the drawings.

One embodiment of the present invention relates to a rolled-structure energy storage device including at least a pair of rolled electrode bodies.

Figure 8:
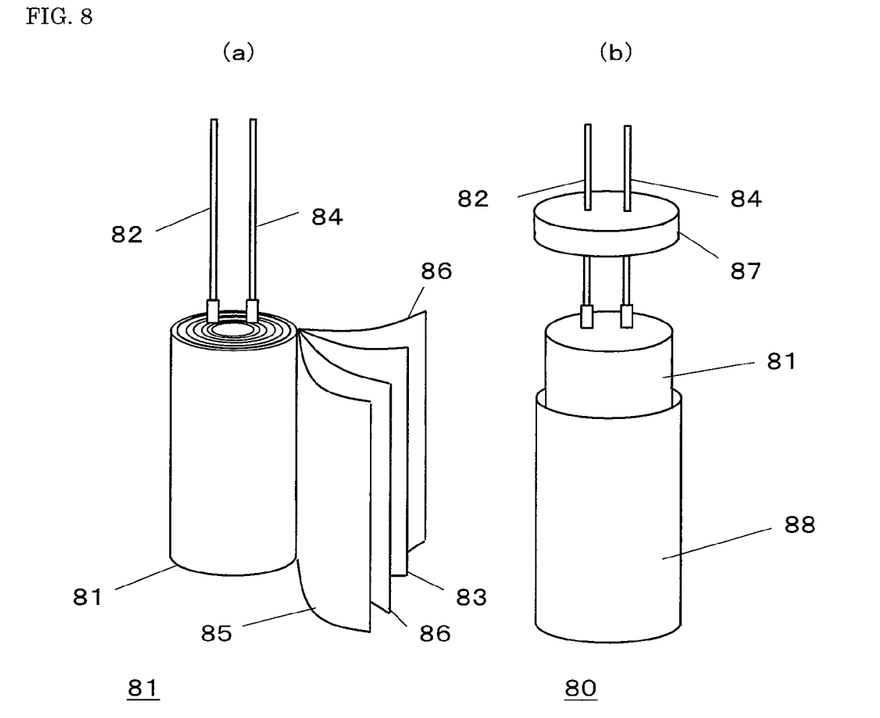
FIG. 8(a) is a perspective view showing a state where an electrode body is rolled in a rolled-structure energy storage device element.
FIG. 8(b) is a perspective view showing a state where the rolled electrode body is formed integrally with a sealing cap and inserted in a metal case in a rolled-structure energy storage device.

FIG. 8(a) is a perspective view showing a state where the electrode body of the rolled-structure energy storage device element of the present embodiment is rolled. FIG. 8(b) is a perspective view showing a state where the rolled electrode body is formed integrally with a sealing cap and is inserted into a metal case. As shown in FIGS. 8(a) and 8(b), an energy storage device element 81 is configured such that a cathode 83 to which a cathode lead wire 82 is connected and an anode 85 to which an anode lead wire 84 is connected are rolled with a separator 86 interposed therebetween. A sealing cap 87 made of rubber is attached to the cathode lead wire 82 and anode lead wire 84 of the energy storage device element 81. Further, the energy storage device element 81 is impregnated with a driving electrolytic solution, and is then stored in a bottomed cylindrical metal case 88 made of aluminum. In the state where the energy storage device element 81 is stored in the metal case 88, the sealing cap 87 is located at an opening of the metal case 88. Then, by carrying out horizontal drawing and curling with respect to the opening of the metal case 88, the sealing cap 87 is attached to the opening of the metal case 88 to seal the opening of the metal case 88. Thus, an energy storage device 80 is configured.

A separator does not depend on the type of the energy storage device in principle. However, in a case where reflow especially needs to be carried out, heat resistance is required for the separator. In a case where the heat resistance is not required of the separator, a synthetic polymer material, such as polypropylene, may be used for the separator, and in a case where the heat resistance is required for the separator, a cellulose-based material may be used for the separator.

A material of the electrolytic solution needs to be selected depending on the type of the energy storage device. To prevent electrochemical decomposition from being caused by a working voltage range, a solvent having an appropriate potential window needs to be selected as a solvent of the electrolytic solution. It is possible to use general propylene carbonate, ethylene carbonate, ethyl methyl carbonate, or a mixed solvent thereof. However, in a case where the reflow needs to be carried out for soldering, a high-boiling-point solvent, such as sulfolane, is used to prevent the electrolytic solution from boiling at the time of the reflow.

As an electrolyte, various known materials can be used. For example, in the electric double layer capacitor, tetraethylammonium tetrafluoroborate can be used as the electrolyte. In the lithium ion secondary battery, lithium pentafluorophosphate or the like can be used as the electrolyte. By synthesizing the carbon nanotube having the diameter corresponding to the ion diameter of an ionic electrolyte, it is possible to manufacture the energy storage device having the highest energy density per unit weight.

Figure 5:
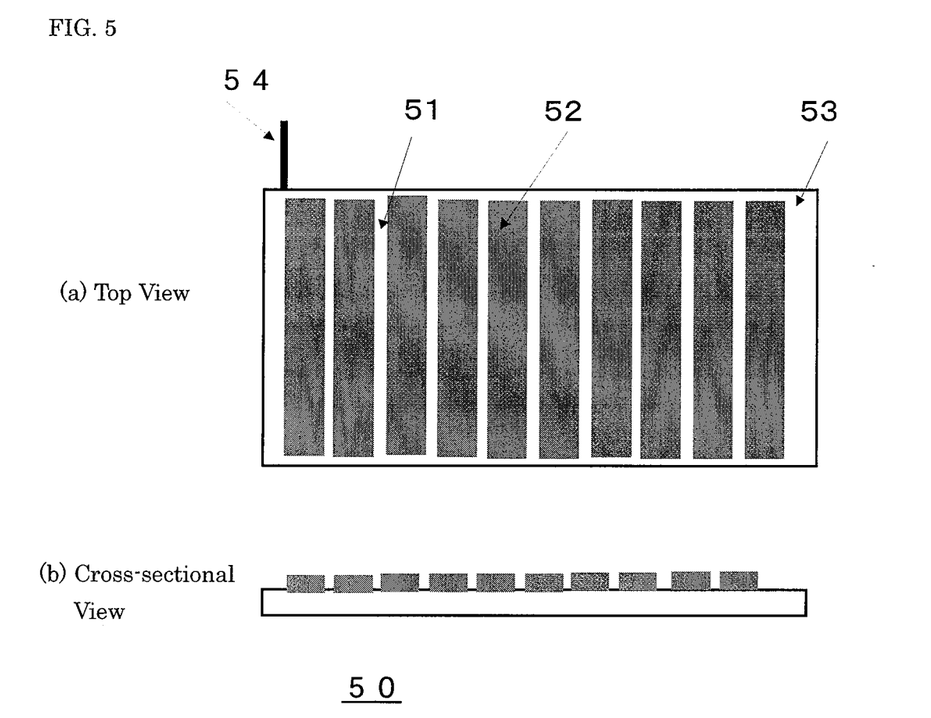
FIG. 5 are diagrams each showing a state where the coupling region and the non-coupling region are formed on the electric conductor, and the layer of the carbon nanotubes formed on the coupling regions is not compressed.

FIG. 5 is a top view showing a state immediately after the carbon nanotubes are formed on the electric conductor. Then, by compressing the layer of the carbon nanotubes, the cathode or the anode in the present invention may be configured. Normally, the lead wires are not connected at this point. However, for ease of explanation, FIG. 5 shows a state where a lead wire 54 is connected to an electric conductor 53. In FIG. 5, layers (not compressed) 52 of the carbon nanotubes that are the electrode active materials are formed on the coupling regions of the electric conductor 53. As shown in FIG. 5, the electric conductor 53 is typically a rectangular sheet whose left and right sides are short sides and whose upper and lower sides are long sides. The electric conductor 53 is rolled in a direction toward the right side such that the left side at which the lead wire 54 is located becomes the center of the roll.

A plurality of non-coupling regions 51 are formed on the surface of the electric conductor 53 in a stripe shape so as to each extend in a direction parallel to the lead wire 54. Here, the "direction parallel to the lead wire" denotes a vertical direction in FIG. 5. It is preferable that the non-coupling regions 51 be formed to each extend in the direction parallel to the lead wire. This is because a power collecting efficiency improves. Note, "parallel" does not denote parallel in strict sense, and slight inclination (about 30 degrees for example) may be acceptable as long as the above advantage can be obtained. Since the electric conductor 53 of FIG. 5 is rolled in a direction from the left side to the right side when constituting the cathode or the anode, the left side is located near a central axis of the roll.

Figure 4:
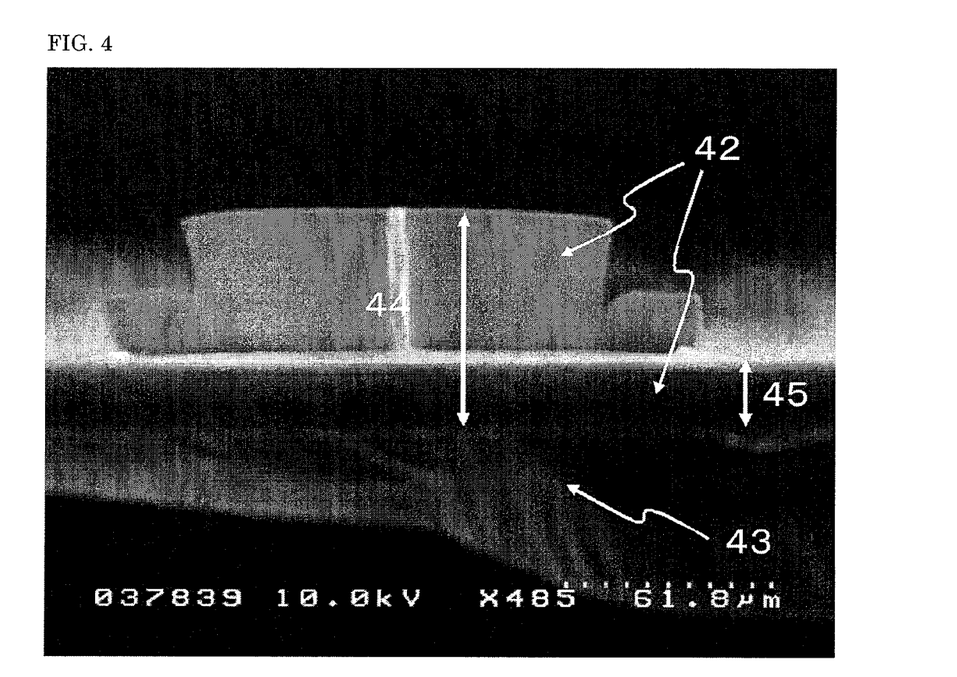
FIG. 4 is a scanning electron micrograph and shows a cross section of the state of FIG. 2.

In the present invention, as shown in the cross-sectional views of FIGS. 4 and 5, the "non-coupling region" denotes a region where the carbon nanotubes do not exist before compression. The non-coupling region may be a region where the catalyst metal necessary for the synthesis of the carbon nanotube is not formed and the carbon nanotubes are therefore not formed, or may be a region formed by removing by, for example, a blade, such as a razor, a part of the layer of the carbon nanotubes formed entirely.

Figure 3:
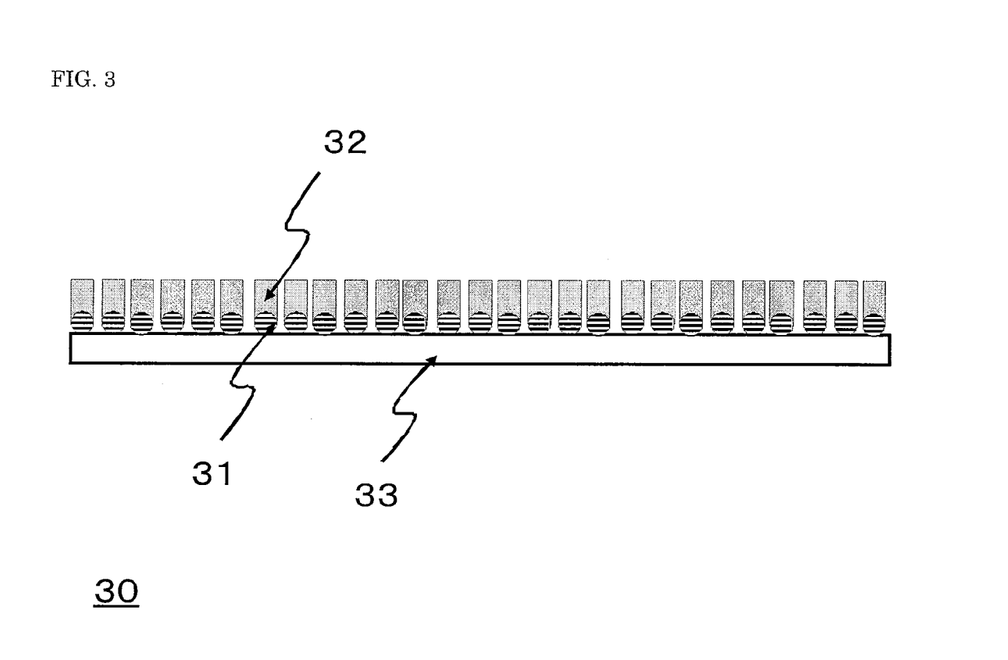
FIG. 3 is a cross-sectional conceptual diagram showing a state where the non-coupling region is not formed on the electric conductor, and the layer of the carbon nanotubes is formed on an entire surface of the electric conductor and is not compressed.

FIG. 3 is a cross-sectional schematic diagram showing a state where the non-coupling region is not formed, and the carbon nanotubes are formed on the entire surface of the electric conductor (before compression). Carbon nanotubes 32 are formed on a catalyst metal 31 formed on the entire surface of an electric conductor 33.

Figure 2:
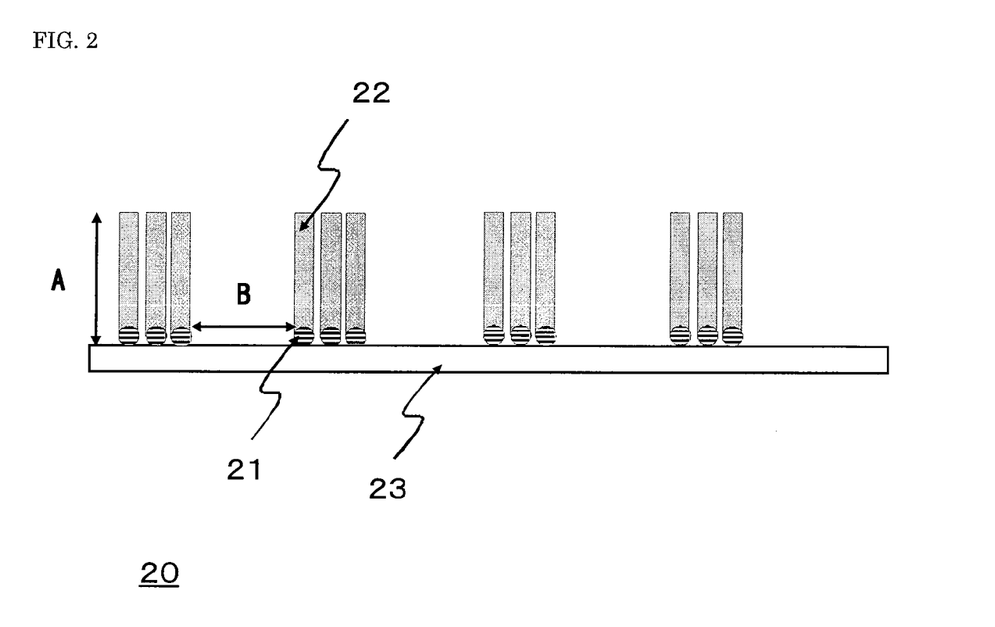
FIG. 2 is a cross-sectional conceptual diagram showing a state where the coupling region and the non-coupling region are formed on the electric conductor, and the layer of the carbon nanotubes formed on the coupling regions is not compressed.

Meanwhile, FIG. 2 is an enlarged schematic diagram of the cross-sectional view of FIG. 5, and is a cross-sectional schematic diagram showing a state where the non-coupling region is formed, and the carbon nanotubes are formed only in the coupling regions on the surface of the electric conductor (before compression). Catalyst metals 21 necessary for the synthesis of the carbon nanotube are formed on an electric conductor 23 in a stripe pattern when viewed from its upper surface, and carbon nanotubes 22 are formed only in the coupling regions on the surface of the electric conductor 23 using the catalyst metals 21 as origins of the synthesis. In this case, the amount of catalyst metal decreases in accordance with the area of the non-coupling regions as compared to a case of FIG. 3 where the catalyst metal is formed on the entire surface. Therefore, this is a first advantage that a reaction current generated by a reaction between the catalyst metal and the electrolytic solution is reduced in accordance with a ratio of reduction of the amount of catalyst metal.

Figure 7:
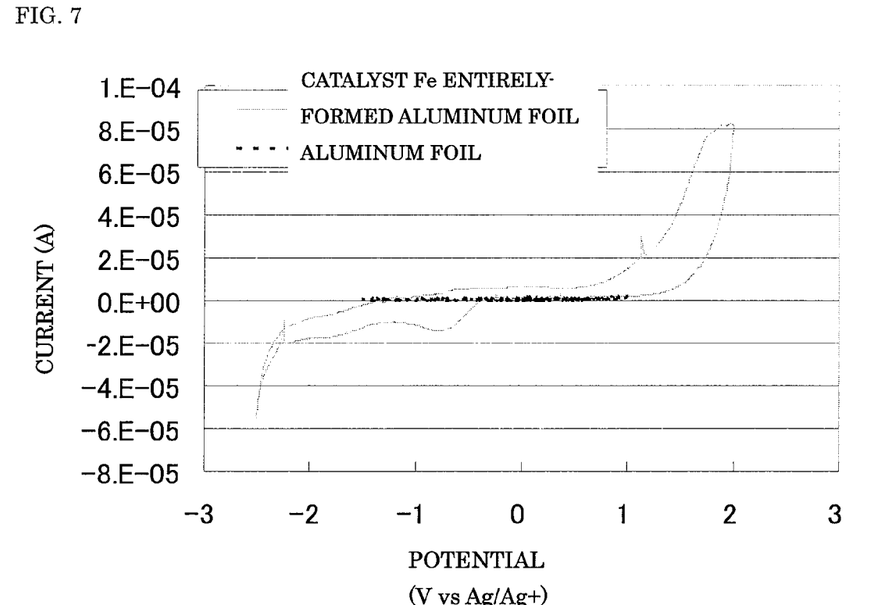
FIG. 7 is a graph showing a reaction current (vertical axis) in an electrolytic solution with respect to an electrode potential (horizontal axis), in aluminum foil on which a catalyst Fe layer is entirely formed and in aluminum foil on which a catalyst layer is not formed.

FIG. 7 proves this advantage, and is a graph showing the reaction current (vertical axis) in the electrolytic solution with respect to an electrode potential (horizontal axis), in aluminum foil on which a catalyst Fe layer is entirely formed and in aluminum foil on which a catalyst layer is not formed. According to the graph, in the case where the catalyst Fe is entirely formed on the aluminum foil, the reaction current steeply increases from a point where the potential relative to an Ag/Ag+ reference electrode is around +1.0 V. However, such phenomenon is not observed in the case of the aluminum foil on which the catalyst layer is not formed.

This phenomenon can be explained by the fact that Fe is ionized by +1.298 V (see "ionization tendency" in RIKA-GAKUJITEN (Dictionary of Physics and Chemistry)) relative to the Ag/Ag+ reference electrode to be $Fe^{2+}$, and flows into the electrolytic solution. Moreover, aluminum is ionized by +2.462 V. Therefore, in a case where the potential is around +1.0 V, the amount of reaction current in the case of aluminum is much smaller than that in the case of Fe. If the voltage applied to the energy storage device increases, aluminum is also ionized. Therefore, it is desirable that the electrolytic solution and the surface of the aluminum foil exposed to the electrolytic solution be prevented from contacting each other by covering the surface of the aluminum foil with the layer of the carbon nanotubes, a water-repellent film, or the like.

Most commonly proposed as a carbon nanotube growth mechanism is a carbon nanotube material gas supply rate-limiting model. According to this model, a distance between catalyst metallic particles is shorter than 20 nm, which is very short as compared to the height of the carbon nanotube, i.e., 100 nm to 1 cm. Therefore, as the height of the carbon nanotube increases by the progress of the synthesis, the material gas supplied from above the layer of the carbon nanotubes becomes less likely to reach the catalyst metallic particles located at the bottom of the carbon nanotube. On this account, a growth rate of the carbon nanotube decreases with synthesis time. Specifically, as shown in FIG. 3, in a case where the non-coupling region is not formed, and the carbon nanotubes are formed on the entire surface of the electric conductor, the height of the carbon nanotube just reaches about 20 μm in 30 minutes of the synthesis time.

In contrast, as shown in FIG. 2, in a case where the non-coupling region is formed, and the carbon nanotubes are formed only in the coupling regions on the surface of the electric conductor, the material gas easily reaches the catalyst metallic particles located at the bottom of the carbon nanotube through a space above the non-coupling region. Therefore, it is possible to avoid the decrease in growth rate of the carbon nanotube with time. Specifically, on condition that the ratio of the width of the coupling region to the width of the non-coupling region is 1 to 1, and the synthesis time is 30 minutes, the height of the carbon nanotube reaches about 60 μm that is three times the above case. FIG. 4 is a scanning electron micrograph and shows a cross section when the carbon nanotube is synthesized under these conditions.

According to the above, the amount of carbon nanotubes synthesized when the non-coupling region is formed is 3/2 times, i.e., 1.5 times the amount of carbon nanotubes synthesized when the non-coupling region is not formed. This is a second advantage that, for example, when the electric double layer capacitor is manufactured as the energy storage device, the energy density becomes 1.5 times.

According to the above, there is an advantage that in a case where the non-coupling region is formed, the amount of reaction current generated in the energy storage device is reduced to improve the reliability, and in addition, the energy density improves.

In the present invention, as shown in FIGS. 2 and 5, the layer of the carbon nanotubes is formed only in the coupling region such that one end of each carbon nanotube is coupled to and electrically connected to the electric conductor. Then, the layer is compressed to topple the carbon nanotubes. Thus, the carbon nanotubes cover the non-coupling region on the surface of the electric conductor. With this, the compressed layer of the carbon nanotubes is formed on the surface of the electric conductor.

Figure 1:
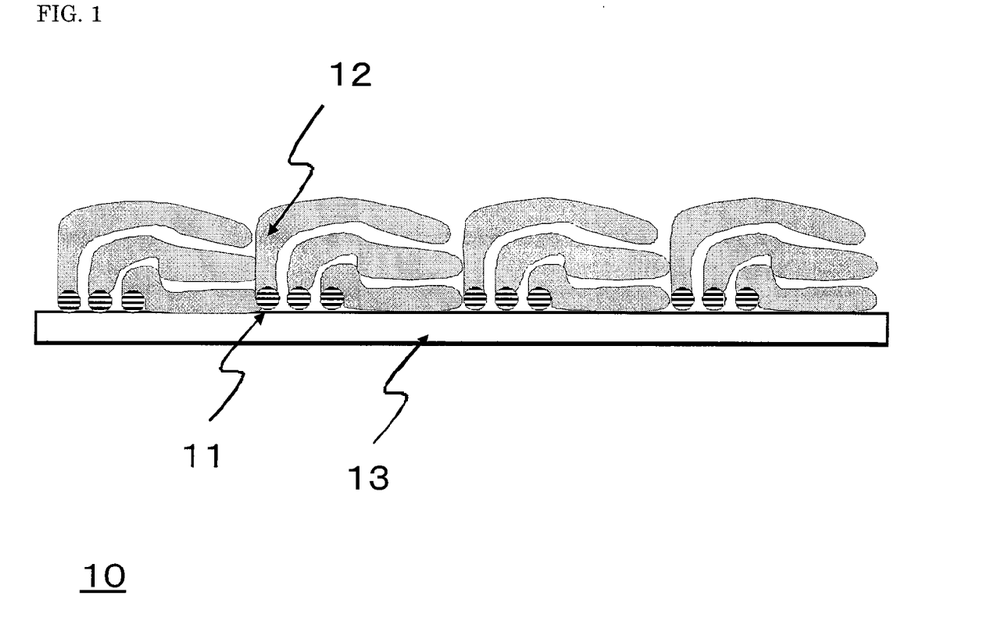
FIG. 1 is a cross-sectional conceptual diagram showing a state where a coupling region and a non-coupling region are formed on an electric conductor, a layer of carbon nanotubes formed on the coupling region is compressed, and the carbon nanotubes cover the surface of the non-coupling region.

FIG. 1 conceptually shows a state where the layer of the carbon nanotubes is compressed, and the carbon nanotubes cover the surface of the non-coupling region. In light of the suppression of the reaction current, it is preferable that the catalyst metallic particles be formed only on the surface of the coupling region and not formed on the surface of the non-coupling region.

By compressing the layer of the carbon nanotubes to cover the surface of the non-coupling region with the layer, it is possible to prevent the electrolytic solution and the electric conductor from directly contacting each other and prevent the electrolytic solution from being decomposed by voltage application. In addition, it is possible to minimize the decrease in electric capacity due to the decrease in the layer of the carbon nanotubes. Further, since the thickness of the layer of the carbon nanotubes decreases by the compression, the distance between the electrodes can be shortened. This brings benefits, i.e., decreases an ion resistance and increases a power density.

Examples of the method for compressing the layer of the carbon nanotubes are a roll-roll press method, a method using a pressing machine, and a solution compression method. In the roll-roll press method, the electric conductor having the surface on which the layer of the vertically-aligned carbon nanotubes is formed is caused to move through a predetermined-width gap between two rolls to realize high density and rolling. In the method using the pressing machine, the electric conductor having the surface on which the layer of the vertically-aligned carbon nanotubes is formed is held on a fixed base, and a flat plate is caused to press the electric conductor from above by predetermined pressure using a mechanical press or a hydraulic press. In the solution compression method, the electric conductor having the surface on which the layer of the vertically-aligned carbon nanotubes is formed is immersed in a solution, the carbon nanotubes are caused to align in one direction by gravity and a surface tension when pulling up the electric conductor from the solution, and the electric conductor is then dried.

In the case where the layer of the carbon nanotubes is compressed as above, a volume density of the layer of the carbon nanotubes reaches 0.1 to 1.5 g/cc. In contrast, the volume density of the layer of the carbon nanotubes immediately after the synthesis of the carbon nanotubes is normally about 0.01 to 0.10 g/cc. Moreover, the volume density of the graphite having a close-packed graphene structure is 1.5 g/cc. Therefore, the volume density of the layer of the carbon nanotubes may reach 1.5 g/cc at most by compression.

It is preferable that the water-repellent film made of a fluorinated material, a silane-based material, or the like be formed in the non-coupling region on the surface of the electric conductor. This prevents direct contact between the electrolytic solution and the electric conductor. Therefore, the decomposition of the electrolytic solution can be avoided.

A large number of the non-coupling regions preferably extending from an upper side to lower side of the electric conductor are arranged in a stripe pattern extending in a direction parallel to the lead wire. This reduces the amount of reaction current of the electrolytic solution. Therefore, the decrease in reliability of the energy storage device can be prevented.

In FIG. 2, it is preferable that a formula "A/B≥1" be satisfied where A is the length of the carbon nanotube, and B is the width of the non-coupling region (distance between adjacent coupling regions). In this case, since all the non-coupling regions are covered with the toppled carbon nanotubes, the electric conductor is not exposed to the electrolytic solution in the non-coupling region. Therefore, the generation of the reaction current can be suppressed. Moreover, since an electronic resistance generated by the contact between the carbon nanotubes decreases, an internal resistance of the energy storage device can be decreased. Even if the thickness A of the carbon nanotube is very large, the effect of suppressing the reaction current is small.

As a method for forming the non-coupling region 51, there are two methods, i.e., a method A including a pretreatment carried out before synthesizing the carbon nanotube and a method B for forming the non-coupling region 51 after synthesizing the carbon nanotube.

In the method A, in a step of forming on the electric conductor the catalyst metal layer necessary for the growth of the carbon nanotube, a region where the catalyst metal does not exist is provided on the electric conductor. Specifically, by patterning the catalyst metal layer, the catalyst metal layer is formed only in a region where the layer of the carbon nanotubes will be formed. Examples of the method for patterning the catalyst metal layer are: a method for directly forming the catalyst metal layer by ink jet printing in a predetermined pattern; a method for covering the electric conductor with a patterning mask having a predetermined pattern and forming the catalyst metal layer on the electric conductor by physical vapor deposition, such as vacuum deposition or sputtering, plating, dip coating, spin coating, or the like; and a method for covering the electric conductor with a patterning mask having a predetermined pattern, forming the water-repellent film on the non-coupling region of the electric conductor by the physical vapor deposition (such as vacuum deposition), wet coating, or the like, and forming by the dip coating the catalyst metal layer in the coupling region (region where the water-repellent film is not formed) of the electric conductor on which the water-repellent film is formed.

In the method B, the layer of the carbon nanotubes is formed on the entire surface of the electric conductor, and a part of the carbon nanotubes is then mechanically peeled off and removed to form the non-coupling region. In this case, a metal wire, a blade (such as a razor), an adhesive tape, or the like may be used.

Another embodiment of the present invention relates to a unipolar-type or stack-type non-rolled-structure energy storage device including at least a pair of electrode bodies which are not rolled.

Figure 9:
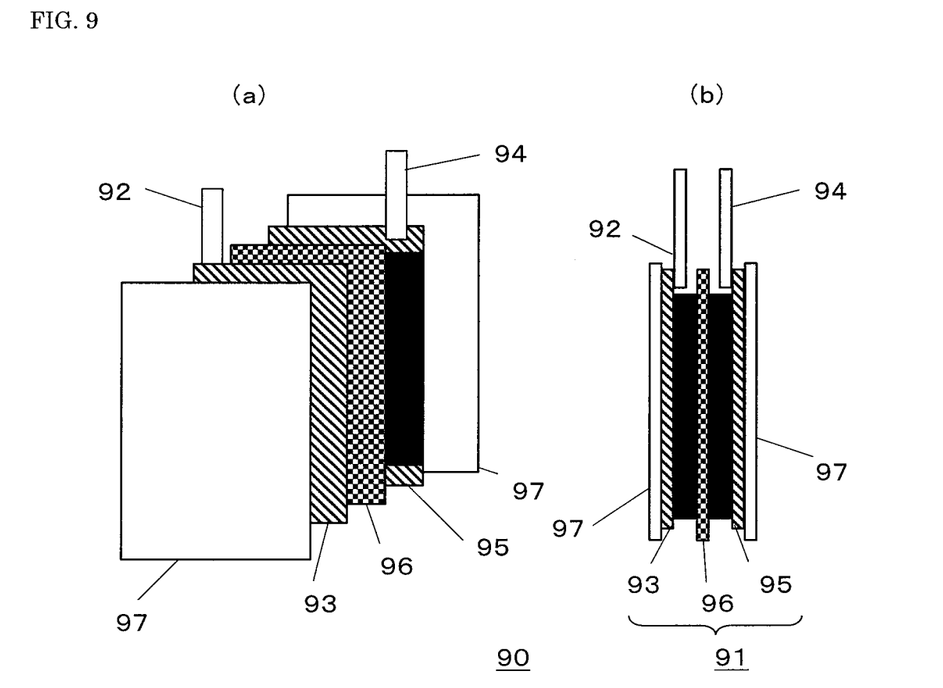
FIG. 9 are diagrams each showing the configuration of a stack-structure energy storage device.

FIG. 9(a) is a perspective view showing the configuration of a stack-structure energy storage device 90 according to the present embodiment. FIG. 9(b) is a cross-sectional view showing a state where the energy storage devices 90 are stacked. As shown in FIGS. 9(a) and 9(b), an energy storage device element 91 is configured such that a cathode 93 to which a cathode lead wire 92 is connected and an anode 95 to which an anode lead wire 94 is connected are stacked with a separator 96 interposed therebetween. After the energy storage device element 91 is impregnated with the driving electrolytic solution, it is stored and sealed in a laminate case 97 formed by aluminum foil. Thus, the energy storage device 90 is configured.

Figure 10:
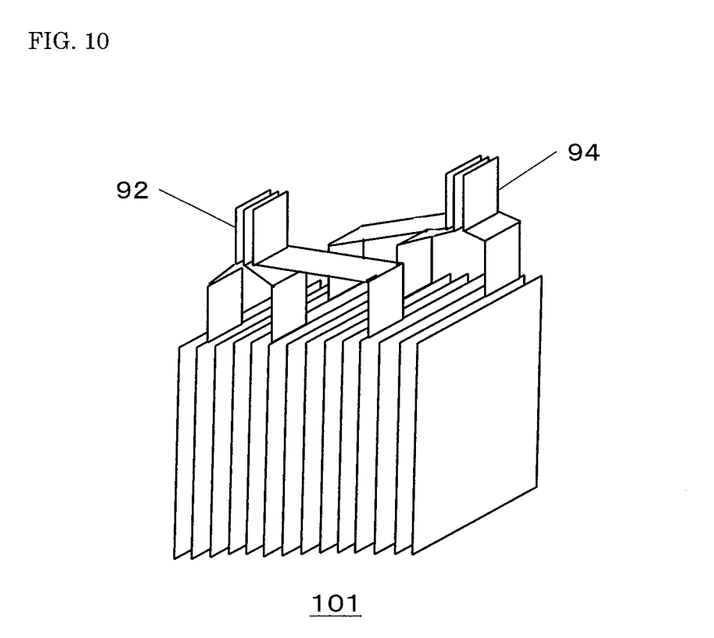
FIG. 10 is a perspective view showing the configuration of a large-scale stack-type energy storage device element in which a plurality of stack-type energy storage device elements are combined.

FIG. 10 is a perspective view showing the configuration of a large-scale stack-type energy storage device element in which a plurality of stack-type energy storage device elements of FIG. 9(a) are combined. A plurality of energy storage device elements 91 are combined to constitute a large-scale stack-type energy storage device element 101. The elements can store and emit energy through a group of cathode lead wires 92 and a group of anode lead wires 94.

FIGS. 6(a) and 6(b) are top views each showing a state immediately after the carbon nanotubes are formed on the electric conductor, which can be used in the present embodiment. In FIGS. 6(a) and 6(b), a layer 63 of the carbon nanotubes is not formed on the entire surface of the electric conductor 64, but the non-coupling regions are formed in a predetermined pattern. In FIG. 6(a), the shape of the layer 63 of the carbon nanotubes is quadrangular when viewed from above, and the non-coupling region is formed in a vertical-horizontal lattice pattern. However, the present embodiment is not limited to the vertical-horizontal lattice pattern, but the non-coupling region may be formed in a brace-shape lattice pattern. In FIG. 6(b), the shape of the layer 63 of the carbon nanotubes is circular when viewed from above, and the non-coupling region is a region other than those circles.

Figure 6:
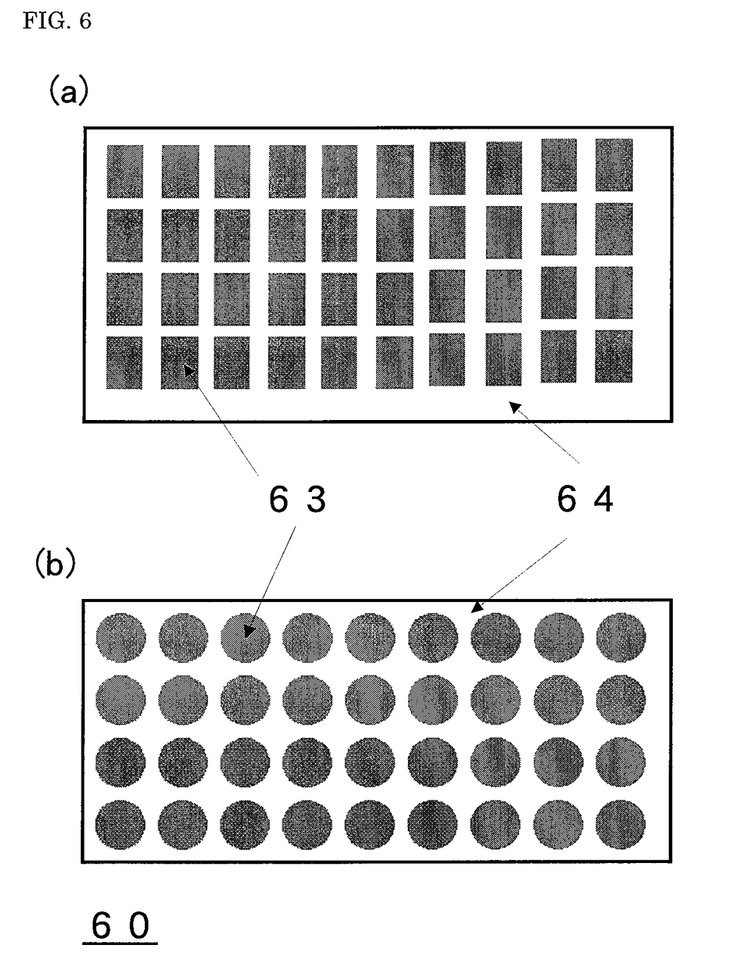
FIG. 6 are top views each showing a state where the coupling regions and the non-coupling regions are formed on the electric conductor, and the layer of the carbon nanotubes formed on the coupling regions is not compressed.

Moreover, in the present embodiment, it is preferable that the non-coupling region be formed in a stripe pattern extending in a direction parallel to the lead wire, as with the rolled-structure energy storage device of FIG. 5. In this case, since the non-coupling region is small as compared to FIGS. 6(*a*) and 6(*b*), the energy density is high. Therefore, the power collecting efficiency improves.

The significance, horizontal width, pitch, formation method, and the like of the non-coupling region in the non-rolled-structure energy storage device are the same as those in the rolled-structure energy storage device.

EXAMPLES

The present invention will be explained in detail using Examples below. However, the present invention is not limited to these Examples.

Example 1

In a state where aluminum foil (15 μm in thickness) that was the electric conductor was covered with a striped patterning mask having a slit width of 400 μm and a slit-to-slit distance of 400 μm, Fe that was the catalyst metal used for the synthesis of the carbon nanotube was electron-beam-evaporated on the aluminum foil so as to have a thickness of 1 nm. Thus, a Fe film was formed on the surface of the electric conductor in a stripe pattern having the width of 400 μm and the distance of 400 μm.

Plasma CVD was carried out with respect to the aluminum foil at 620° C. using ethylene as a carbon source. Thus, the layer of the carbon nanotubes was formed on the surface of the Fe film so as to have an average thickness of 403 μm. With this, bundles of the carbon nanotubes were vertically formed on the surface of the aluminum foil in a stripe pattern having the width of 400 μm and the distance of 400 μm. To be specific, one end of the bundle was connected to the aluminum foil.

The aluminum foil on which the carbon nanotubes were formed as above was put in a roll press to compress the bundle of the carbon nanotubes. With this, the carbon nanotubes were toppled, and the surface of the non-coupling region was covered with the carbon nanotubes. The above compression was carried out by the roll press such that the aluminum foil was caused to repeatedly move between rolls several times at a feed speed of 40 m/min by pressure of 100 tonf with respect to the width of 100 mm.

Then, as shown in FIG. 5, the lead wire was connected to each aluminum foil. Thus, the cathode and the anode were manufactured. The separator was interposed between the electrodes, and these components were rolled. Then, the roll was impregnated with the electrolytic solution, and stored in the case. Thus, the rolled-structure energy storage device was manufactured.

The reaction current was 13 μA when the applied voltage was +1.0 V. The reaction current was defined as a current measured ten minutes after a predetermined voltage was applied.

Example 2

The rolled-structure energy storage device was manufactured in the same manner as in Example 1 except that the average thickness of the layer of the carbon nanotubes was changed to 522 μm. The reaction current was 11 μA when the applied voltage was +1.0V.

Example 3

In a state where the aluminum foil (15 μm in thickness) that was the electric conductor was covered with a vertical-horizontal lattice patterning mask having 400-μm convex squares and a square-to-square distance of 400 μm, the water-repellent film was formed on the aluminum foil and dried. The water-repellent film was formed such that an operation of applying toluene diluted modified polypropylene (UNISTOLE R-200 produced by Mitsui Chemicals, Inc.) to the aluminum foil and carrying out heating for five minutes at 170° C. in an electric furnace was carried out twice.

Next, to form the film of Fe that was the catalyst metal used for the synthesis of the carbon nanotube by the dip coating, the aluminum foil was immersed in an iron acetate ethanol solution, pulled out from the solution at a rate of 4 cm/min, and dried at 400° C. for 30 minutes. Thus, the Fe film was formed on the surface of the electric conductor such that 400-μm squares were arranged at intervals of 400 μm.

The plasma CVD was carried out with respect to the aluminum foil at 620° C. using ethylene as the carbon source. Thus, the layer of the carbon nanotubes was formed on the surface of the Fe film so as to have the average thickness of 407 μm. With this, the bundles of the carbon nanotubes were vertically formed on the surface of the aluminum foil such that 400-μm squares were arranged at intervals of 400 μm.

The aluminum foil on which the carbon nanotubes were formed as above was put in the roll press to compress the bundle of the carbon nanotubes. With this, the carbon nanotubes were toppled, and the surface of the non-coupling region was covered with the carbon nanotubes.

Then, as shown in FIG. 5, the lead wire was connected to each aluminum foil. Thus, the cathode and the anode were manufactured. The separator was interposed between the electrodes, and these components were rolled. Then, the roll was impregnated with the electrolytic solution, and stored in the case. Thus, the rolled-structure energy storage device was manufactured.

The reaction current was 10 μA when the applied voltage was +1.0 V.

Example 4

In a state where the aluminum foil (15 μm in thickness) that was the electric conductor was covered with a vertical-horizontal lattice patterning mask having 400-μm square slits and the slit-to-slit distance of 400 μm, Fe that was the catalyst metal of the carbon nanotube was electron-beam-evaporated on the aluminum foil so as to have a thickness of 1 nm. Thus, the Fe film was formed on the surface of the electric conductor such that 400-μm squares were arranged at intervals of 400 μm.

The plasma CVD was carried out with respect to the aluminum foil at 620° C. using ethylene as the carbon source. Thus, the layer of the carbon nanotubes was formed on the surface of the Fe film so as to have the average thickness of 410 μm. With this, the bundles of the carbon nanotubes were vertically formed on the surface of the aluminum foil such that 400-μm squares were arranged at intervals of 400 μm.

The aluminum foil on which the carbon nanotubes were formed as above was put in the roll press to compress the bundle of the carbon nanotubes. With this, the carbon nanotubes were toppled, and the surface of the non-coupling region was covered with the carbon nanotubes.

Then, as shown in FIG. 5, the lead wire was connected to each aluminum foil. Thus, the cathode and the anode were manufactured. The separator was interposed between the electrodes, and these components were stacked. Then, the stack was impregnated with the electrolytic solution, and crimped by and stored in a laminate case. Thus, the stack-type energy storage device was manufactured.

The reaction current was 10 μA when the applied voltage was +1.0 V.

Example 5

The stack-type energy storage device was manufactured in the same manner as in Example 4 except that used as the patterning mask was a circular lattice patterning mask having circular slits of 400 μm in diameter and a slit-to-slit minimum distance of 400 μm. The average thickness of the layer of the carbon nanotubes was 409 μm.

The reaction current was 9 μA when the applied voltage was 1.0 V.

Comparative Example 1

The rolled-structure energy storage device was manufactured in the same manner as in Example 1 except that the layer of the carbon nanotubes was formed on the entire surface of the electric conductor without using the patterning mask. Conditions for the synthesis of the carbon nanotubes and the reaction time were the same as those in Example 1, but the thickness of the carbon nanotube was only 113 μm. The reaction current was 42 μA when the applied voltage was +1.0 V.

Comparative Example 2

The stack-type energy storage device was manufactured in the same manner as in Example 4 except that the layer of the carbon nanotubes was formed on the entire surface of the electric conductor without using the patterning mask. Conditions for the synthesis of the carbon nanotubes and the reaction time were the same as those in Example 4, but the thickness of the carbon nanotube was only 121 μm. The reaction current was 38 μA when the applied voltage was +1.0 V.

Comparative Example 3

The rolled-structure energy storage device was manufactured in the same manner as in Example 1 except that the layer of the carbon nanotubes was formed on the entire surface of the electric conductor without using the patterning mask, and the layer of the carbon nanotubes was not compressed. Conditions for the synthesis of the carbon nanotubes and the reaction time were the same as those in Example 1, but the thickness of the carbon nanotube was only 118 μm. The reaction current was 55 μA when the applied voltage was +1.0 V.

Reference Example

In a state where the aluminum foil (15 μm in thickness) that was the electric conductor was covered with a striped patterning mask having the slit width of 400 μm and the slit-to-slit distance of 400 μm, Fe that was the catalyst metal used for the synthesis of the carbon nanotube was electron-beam-evaporated on the aluminum foil so as to have a thickness of 1 nm. Thus, the Fe film was formed on the surface of the electric conductor in a stripe pattern having the width of 400 μm and the distance of 400 μm.

The plasma CVD was carried out with respect to the aluminum foil at 620° C. using ethylene as the carbon source. Thus, the layer of the carbon nanotubes was formed on the surface of the Fe film so as to have the average thickness of 518 μm. With this, the bundles of the carbon nanotubes were vertically formed on the surface of the aluminum foil in a stripe pattern having the width of 400 μm and the distance of 400 μm.

Without compressing the bundles of the carbon nanotubes formed as above, the lead wire was connected to each aluminum foil as shown in FIG. 5. Thus, the cathode and the anode were manufactured. The separator was interposed between the electrodes, and these components were rolled. Then, the roll was impregnated with the electrolytic solution, and stored in the case. Thus, the rolled-structure energy storage device was manufactured.

The reaction current was 19 μA when the applied voltage was +1.0 V.

TABLE 1

|  | Non-coupling region | Compression | Device structure | Thickness of CNT/Width of non-coupling region | Reaction current by +1.0 V | Formation method of non-coupling region |
|---|---|---|---|---|---|---|
| Example 1 | Formed | Compressed | Roll type | 1.0 | 13 μA | Catalyst patterning Slit shape |
| Example 2 | Formed | Compressed | Roll type | 1.3 | 11 μA | Catalyst patterning Slit shape |
| Example 3 | Formed | Compressed | Roll type | 1.0 | 10 μA | Catalyst patterning Water-repellent film Lattice shape |
| Example 4 | Formed | Compressed | Stack type | 1.0 | 10 μA | Catalyst patterning Lattice shape |
| Example 5 | Formed | Compressed | Stack type | 1.0 | 9 μA | Catalyst patterning Circular shape |
| Comparative Example 1 | Not formed | Compressed | Roll type | — | 42 μA | — |
| Comparative Example 2 | Not formed | Compressed | Stack type | — | 38 μA | — |
| Comparative Example 3 | Not formed | Not compressed | Roll type | — | 55 μA | — |
| Reference Example | Formed | Not compressed | Roll type | 1.3 | 19 μA | Catalyst patterning Slit shape |

According to the above, the present invention can provide a highly reliable energy storage device whose reaction current is lower than that of conventional examples by one third or more.

INDUSTRIAL APPLICABILITY

Since the energy storage device according to the present invention can discharge large current, it is useful as an energy source or an auxiliary power supply in: a portable device, such as a mobile phone, having a radio communication function; a display apparatus, such as a liquid crystal display; an electronic device, such as an information processing terminal, for example, a computer; a transporting device, such as a vehicle or a bicycle; or a medical device, such as an implantable artificial heart.

The invention claimed is:

1. An energy storage device comprising:
   at least a pair of electrode bodies that are a cathode and an anode; and
   an electrolytic solution, wherein:
   at least one of the electrode bodies is configured such that a layer of carbon nanotubes is formed on an electric conductor,
   a surface of the electric conductor includes a coupling region where catalyst metal particles are scattered thereon and a non-coupling region which is a region other than the coupling region,
   in the coupling region, the carbon nanotubes are grown on the catalyst metal particles and one end of each of the carbon nanotubes is electrically coupled to the electric conductor,
   in the non-coupling region, ends of the carbon nanotubes are not coupled to the electric conductor,
   the carbon nanotubes having ends connected to the coupling region are toppled to cover a surface of the non-coupling region, and
   a width of the non-coupling region is larger than a distance between the carbon nanotubes on the coupling region.

2. The energy storage device according to claim 1, wherein a volume density of the layer of the carbon nanotubes is 0.1 to 1.5 g/cc.

3. The energy storage device according to claim 1, further comprising a lead wire connected to the electrode body, wherein
   the non-coupling region is formed in a stripe pattern extending in a direction parallel to a direction of a lead wire extending from the electrode body.

4. The energy storage device according to claim 1, wherein a formula "A/B≥1" is satisfied where A is a length of the carbon nanotube, and B is a width of the non-coupling region.

5. The energy storage device according to claim 1, wherein a water-repellent film is disposed in the non-coupling region on the surface of the electric conductor.

6. The energy storage device according to claim 5, wherein the water-repellent film is made of a fluorinated material.

7. The energy storage device according to claim 1, wherein the energy storage device is an electric double layer capacitor.

8. The energy storage device according to claim 1, wherein a side surface of some of the toppled carbon nanotube contact the surface of the electric conductor consisting of metal in the non-coupling region.

9. The energy storage device according to claim 8, further comprising a lead wire connected to the electrode body,
   wherein the non-coupling region is formed in a stripe pattern extending in a direction parallel to a direction of a lead wire extending from the electrode body.

10. The energy storage device according to claim 1, wherein
    a side surface of some of the toppled carbon nanotube contact the surface of the electric conductor in the non-coupling region without a catalyst metal disposed between the side surface of some of the toppled carbon nanotube and the surface of the electric conductor.

11. The energy storage device according to claim 10, further comprising a lead wire connected to the electrode body,
    wherein the non-coupling region is formed in a stripe pattern extending in a direction parallel to a direction of a lead wire extending from the electrode body.

12. The energy storage device according to claim 4, wherein B is more than 20 nm.

13. The energy storage device according to claim 1, wherein the non-coupling region is formed in a stripe pattern or an island pattern.

14. The energy storage device according to claim 1, wherein the electrolyte solution is liquid.

15. The energy storage device according to claim 1, wherein the electrolyte solution includes one or more solvents selected from the group consisting of propylene carbonate, ethylene carbonate, ethyl methyl carbonate and sulfolane.

16. The energy storage device according to claim 1, wherein plural non-coupling regions are disposed on the surface of the electric conductor.

17. An energy storage device comprising:
    a cathode;
    an anode; and
    an electrolytic solution, wherein:
    at least one of the cathode and the anode includes an electric conductor, on which a layer of carbon nanotubes is formed,
    a surface of the electric conductor consists of a coupling region where the carbon nanotubes are disposed and a non-coupling region which is a region other than the coupling region,
    the coupling region is a region in which one end of each of the carbon nanotubes is coupled to the electric conductor at an interval of less than 20 nm and electrically connected to the electric conductor,
    in the non-coupling region ends of the carbon nanotubes are not coupled to the electric conductor,
    the carbon nanotubes having ends connected to the coupling region are toppled to cover a surface of the non-coupling region, and
    a width of the non-coupling region is more than 20 nm.

18. The energy storage device according to claim 1, wherein the carbon nanotubes extend from the surface of the electric conductor in the coupling region substantially perpendicularly to the surface and then bend toward the surface of the electric conductor in the non-coupling region.

19. The energy storage device according to claim 17, wherein the carbon nanotubes extend from the surface of the electric conductor in the coupling region substantially perpendicularly to the surface and then bend toward the surface of the electric conductor in the non-coupling region.

* * * * *